(12) United States Patent
Sammons

(10) Patent No.: US 11,836,123 B2
(45) Date of Patent: Dec. 5, 2023

(54) AUTOMATED PROCESS FLOW LAYOUT GENERATION

(71) Applicant: Salesforce, Inc., San Francisco, CA (US)

(72) Inventor: Brady Sammons, Walnut Creek, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/173,888

(22) Filed: Feb. 11, 2021

(65) Prior Publication Data

US 2022/0253411 A1     Aug. 11, 2022

(51) Int. Cl.
*G06F 16/20* (2019.01)
*G06F 16/21* (2019.01)
(Continued)

(52) U.S. Cl.
CPC ........ *G06F 16/212* (2019.01); *G06F 3/04817* (2013.01); *G06F 16/256* (2019.01); *G06F 16/288* (2019.01)

(58) Field of Classification Search
CPC ..... G06F 16/212; G06F 16/256; G06F 16/288
See application file for complete search history.

(56) References Cited

U.S. PATENT DOCUMENTS 5,479,698 A * 1/1996 Angel ................. B23P 21/00
                                                  228/49.1
6,161,114 A * 12/2000 King ................... H04L 67/02
                                                  715/202

(Continued)

FOREIGN PATENT DOCUMENTS

WO    WO2010138412    * 12/2010

OTHER PUBLICATIONS

IVoLVER: Interactive Visual Language for Visualization Extraction and Reconstruction. Mendez et al., ACM 2016.*

(Continued)

*Primary Examiner* — Daniel A Kuddus
(74) *Attorney, Agent, or Firm* — Kwan & Olynick LLP

(57) ABSTRACT

Disclosed are some implementations of systems, apparatus, methods and computer program products for generating a layout representing a process flow. Responsive to a first request from a client device to add an instance of a loop element type to a layout represented in a graphical user interface (GUI), the layout is updated such that the layout includes a first loop element defined by a loop element symbol and a loop connector path connected to the loop symbol. Responsive to a second request to add an instance of a second element type to the first loop element, calculating a set of rendering parameters for at least a portion of the layout including the first loop element based, at least in part, on a set of spacing rules and a set of dimensions associated with the second element type. The portion of the layout is updated using the set of rendering parameters such that an updated layout is generated, where the updated layout includes an expanded first loop element defined by the loop symbol and an expanded loop connector path on which a second element of the second element type is positioned, where the expanded loop connector path is connected to the loop symbol. The updated layout may then be provided to the client device.

20 Claims, 14 Drawing Sheets

(51) Int. Cl.
    *G06F 16/28*     (2019.01)
    *G06F 16/25*     (2019.01)
    *G06F 3/04817*     (2022.01)

(56) References Cited

U.S. PATENT DOCUMENTS

| | | | | |
|---|---|---|---|---|
| 6,177,938 | B1* | 1/2001 | Gould | G06F 3/04855 345/440.1 |
| 6,668,354 | B1* | 12/2003 | Chen | G06F 40/221 715/255 |
| 6,928,610 | B2* | 8/2005 | Brintzenhofe | G06F 40/166 715/202 |
| 7,069,395 | B2* | 6/2006 | Camacho | H04L 67/1001 711/112 |
| 7,171,624 | B2* | 1/2007 | Baldwin | G06F 3/0481 715/733 |
| 7,461,332 | B2* | 12/2008 | Brintzenhofe | G06F 40/143 715/204 |
| 7,516,414 | B2* | 4/2009 | Cragun | G06F 9/451 715/777 |
| 8,095,865 | B2* | 1/2012 | Parikh | G06F 9/451 715/744 |
| 8,493,406 | B2* | 7/2013 | Rubin | G06Q 10/06 345/646 |
| 8,984,424 | B2* | 3/2015 | Relyea | G06F 3/0481 715/204 |
| 2003/0079177 | A1* | 4/2003 | Brintzenhofe | G06F 16/9577 715/205 |
| 2003/0146929 | A1* | 8/2003 | Baldwin | G06F 3/0481 715/733 |
| 2003/0154267 | A1* | 8/2003 | Camacho | G06F 3/0601 709/223 |
| 2005/0172237 | A1* | 8/2005 | Cragun | G06F 9/451 715/744 |
| 2007/0104216 | A1* | 5/2007 | Kim | H04J 13/20 370/464 |
| 2007/0204216 | A1* | 8/2007 | Morgan | G06F 40/106 715/210 |
| 2009/0132578 | A1* | 5/2009 | Parikh | G06F 9/451 707/999.102 |
| 2010/0199198 | A1* | 8/2010 | Relyea | G06F 3/0488 715/762 |
| 2010/0321391 | A1* | 12/2010 | Rubin | G06T 3/40 345/441 |
| 2010/0325166 | A1* | 12/2010 | Rubin | G06Q 10/04 707/791 |

OTHER PUBLICATIONS

Mendez et al., iVoLVER: Interactive Visual Language for Visualization Extraction and Reconstruction; ACM 2016.*

B2B Marketing Automation; Salesforce.com, Inc., 2021; Retrieved from the Internet at https://www.pardot.com/solutions/b2b-marketing-automation/.

Microsoft Power Automate; Retrieved from the Internet on Feb. 11, 2021, https://flow.microsoft.com/en-us/.

Sammons, Brady; Configuring Choice Components of an Application or Web Page Using a Database System; U.S. Appl. No. 17/099,428, filed Nov. 16, 2020.

* cited by examiner

AUTOMATED PROCESS FLOW LAYOUT GENERATION

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

FIELD OF TECHNOLOGY

This patent document relates generally to systems and techniques associated with generation of layouts representing process flows, and more specifically to generation of a loop element within a layout representing a process flow.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

Existing design tools offer users the ability to design a layout representing a process flow using drag-and-drop operations. These tools generally require that the user manually manipulate elements and associated connectors via a drag and drop process. Since individual elements and associated connectors must be manually positioned on an individual basis, the layout design process can be lengthy and cumbersome.

One design element that is commonly used in layouts is a loop. Typically, a loop is generated through the manually positioning of elements and connectors to form the desired connections between elements.

BRIEF DESCRIPTION OF THE DRAWINGS

The included drawings are for illustrative purposes and serve only to provide examples of possible structures and operations for the disclosed inventive systems, apparatus, methods and computer program products for facilitating the generation of a layout representing a process flow. These drawings in no way limit any changes in form and detail that may be made by one skilled in the art without departing from the spirit and scope of the disclosed implementations.

DETAILED DESCRIPTION

Figure 1:
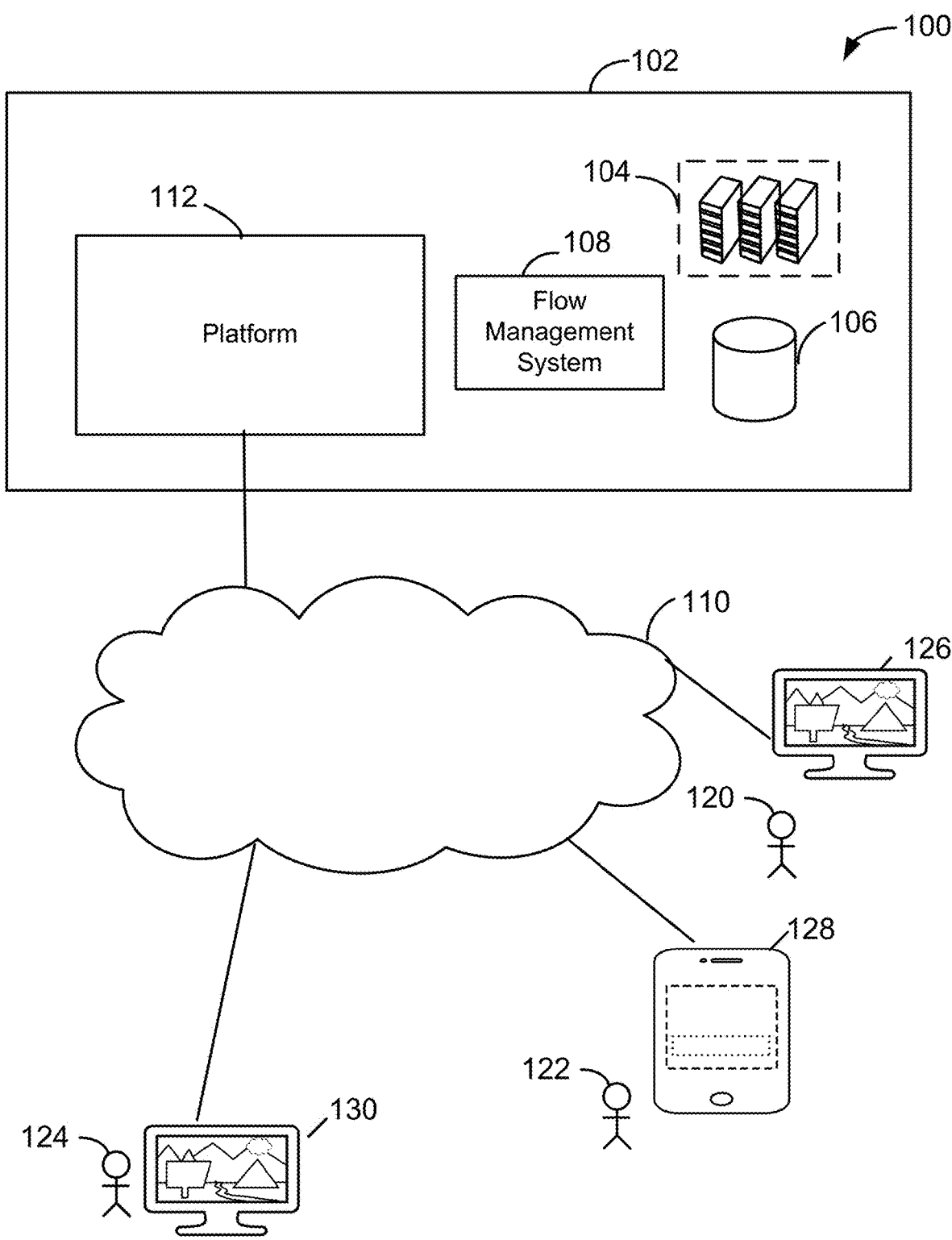
FIG. 1 shows a diagram of an example of a system 100 in which a flow management system is implemented, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from the spirit and scope of the disclosure.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more examples may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

Any of the disclosed implementations may be used alone or together with one another in any combination. The one or more implementations encompassed within this specification may also include examples that are only partially mentioned or alluded to or are not mentioned or alluded to at all in this brief summary or in the abstract. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

Some implementations of the disclosed systems, apparatus, methods and computer program products are configured to facilitate the generation of layouts corresponding to process flows. In some implementations, a database system implemented using a server system provides a click-based layout engine that facilitates the generation of layouts. In other implementations, a click-based layout engine that facilitates the generation of layouts is implemented at a client device.

A process flow may be designed through the generation of a layout that visually represents the process flow. Elements represented in the layout may each correspond to a corresponding set of computer-readable instructions. Elements represented within the layout may be "connected" within the layout through the use of connectors.

During the design of a layout representing a process flow, it is often desirable to create a loop that iterates over one or more elements. A loop may be implemented in a number of ways. One way to implement a loop is the use of a "while" loop, which repeats a specific block of code an unknown number of times until a particular condition is met. Another way to implement a loop is the use of a "for each" loop that iterates over a block of code a specific number of times.

To generate a loop, layout design tools generally require that the user manually manipulate elements and associated connectors (e.g., via a drag and drop process) during the generation and modification of the loop. Since individual elements and associated connectors must be manually positioned on an individual basis, this can be a tedious and time-consuming process. The user is typically expected to organize the loop so that it is logical and well-organized. However, since differing individual styles can result in inconsistent spacing between elements and connectors, this can yield a loop that is confusing and difficult to interpret—particularly if connectors overlap or have minimal space separating them.

In accordance with various implementations, a layout engine provides a click-based layout generation tool that enables users to request that an element be added to a layout. The layout engine dynamically positions, in real-time, the element and associated connectors within the layout to prevent colliding or overlap of connectors, elements, and associated text. In some implementations, the layout engine operates according to spacing rules to generate a loop element that visually encompasses the desired element(s), which improves clarity of the layout through the use of consistent spacing. The spacing rules can be applied to automatically and dynamically format a loop element as elements are selected for addition to the loop.

In some implementations, a layout engine provides a click-based mechanism that enables a user to easily construct a loop by selecting a loop element type from a plurality of element types. Responsive to a request from a client device to add an instance of a loop element type to a layout represented in a graphical user interface (GUI), the layout engine updates the layout, in real-time, such that the layout includes a loop element that is represented by a loop element symbol that is connected to a loop connector path.

In some implementations, a GUI component such as an "add" button may be rendered such that it is positioned within the loop element. Responsive to an indication of a selection of the GUI component, received from the client device, a user interface such as a menu may be provided for presentation by the client device. Through interaction with the menu, a user can submit a request to add an instance of a selected element type to the loop element.

Responsive to receiving a request to add an instance of a selected element type to the loop element, the layout engine automatically expands the loop element to include the requested element. In some implementations, the layout engine calculates a set of rendering parameters for at least a portion of the layout including the loop element based, at least in part, on a set of spacing rules and a set of dimensions associated with the element. The layout engine updates the portion of the layout using the set of rendering parameters such that an updated layout including an expanded loop element is generated. The expanded loop element is represented by a loop symbol and an expanded loop connector path on which the second element is positioned, where the expanded loop connector path is connected to the loop symbol and visually encompasses the second element. In this manner, a loop may be dynamically and automatically updated within a layout while preventing a user from manually adding or manipulating elements or associated connectors.

The examples described herein refer to a single client device to simplify the description. How-ever, it is important to note that the disclosed implementations may be implemented in a collaborative system that enables a layout to be accessed or updated via multiple client devices. Therefore, a single loop may be generated and/or updated responsive to requests received from more than one client device.

FIG. 1 shows a diagram of an example of a system 100 in which a flow management system is implemented, in accordance with some implementations. Database system 102 includes a variety of different hardware and/or software components that are in communication with each other. In the non-limiting example of FIG. 1, system 102 includes any number of computing devices such as servers 104. Servers 104 are in communication with one or more storage mediums 106 configured to store and maintain relevant data and/or metadata used to perform some of the techniques disclosed herein, as well as to store and maintain relevant data and/or metadata generated by the techniques disclosed herein. Storage mediums 106 may further store computer-readable instructions configured to perform some of the techniques described herein. Storage mediums 106 can also store user profiles, layouts, and/or database records such as customer relationship management (CRM) records.

System 102 includes flow management system 108 that facilitates the generation and updating of layouts, as described herein. As will be described in further detail below, flow management system 108 is configured to facilitate the generation and updating of a loop element within a layout.

In some implementations, system 102 is configured to store user profiles/user accounts associated with users of system 102. Information maintained in a user profile of a user can include a client identifier such an Internet Protocol (IP) address or Media Access Control (MAC) address. In addition, the information can include a unique user identifier such as an alpha-numerical identifier, the user's name, a user email address, and credentials of the user. Credentials of the user can include a username and password. The information can further include job related information such as a job title, role, group, department, organization, and/or experience level, as well as any associated permissions. Job related information and any associated permissions can be applied by flow management system 108 to manage access to layouts.

Client devices 126, 128, 130 may be in communication with system 102 via network 110. More particularly, client devices 126, 128, 130 may communicate with servers 104 via network 110. For example, network 110 can be the Internet. In another example, network 110 comprises one or more local area networks (LAN) in communication with one or more wide area networks (WAN) such as the Internet.

Embodiments described herein are often implemented in a cloud computing environment, in which network 110, servers 104, and possible additional apparatus and systems such as multi-tenant databases may all be considered part of the "cloud." Servers 104 may be associated with a network domain, such as www.salesforce.com and may be controlled by a data provider associated with the network domain. In this example, employee users 120, 122, 124 of client computing devices 126, 128, 130 have accounts at Salesforce.com®. By logging into their accounts, users 126, 128, 130 can access the various services and data provided by system 102 to employees. Examples of devices used by users include, but are not limited to a desktop computer or portable electronic device such as a smartphone, a tablet, a laptop, a wearable device such as Google Glass®, another optical head-mounted display (OHMD) device, a smart watch, etc.

In some implementations, users 120, 122, 124 of client devices 126, 128, 130 can access services provided by system 102 via platform 112 or an application installed on client devices 126, 128, 130. More particularly, client devices 126, 128, 130 can log into system 102 via an application programming interface (API) or via a graphical user interface (GUI) using credentials of corresponding users 120, 122, 124 respectively.

Client devices 126, 128, 130 can communicate with system 102 to access, generate, and/or update a layout, as described herein. Communications between client devices 126, 128, 130 and system 102 can be initiated by a user 120, 122, 124. Alternatively, communications can be initiated by system 102 and/or application(s) installed on client devices 126, 128, 130. Therefore, communications between client devices 126, 128, 130 and system 102 can be initiated automatically or responsive to a user request.

Figure 2:
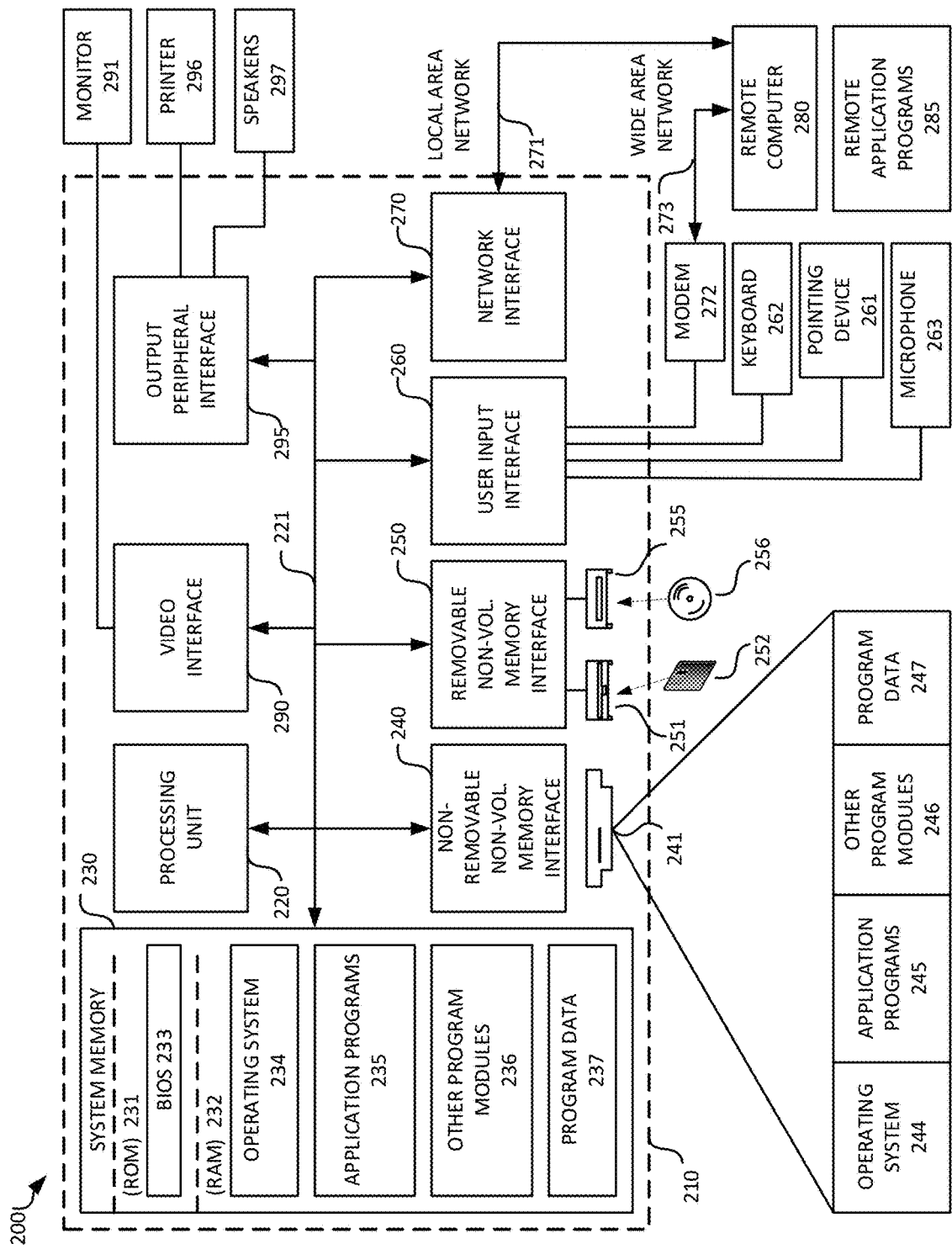
FIG. 2 is a diagram of an example computing system 200 that may be used with some implementations.

FIG. 2 is a diagram of an example computing system 200 that may be used with some implementations. In diagram 202, computing system 210 may, be used by a user to establish a connection with a server computing system. For example, the user may use a browser associated the computing system 200 to access a website associated with an application deployed with a PaaS.

The computing system 210 is only one example of a suitable computing system, such as a mobile computing system, and is not intended to suggest any limitation as to the scope of use or functionality of the design. Neither should the computing system 210 be interpreted as having any dependency or requirement relating to any one or combination of components illustrated. The design is operational with numerous other general purpose or special purpose computing systems. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, mini-computers, mainframe computers, distributed computing environments that include any of the above systems or devices, and the like. For example, the computing system 210 may be implemented as a mobile computing system such as one that is configured to run with an operating system (e.g., iOS) developed by Apple Inc. of Cupertino, Calif. or an operating system (e.g., Android) that is developed by Google Inc. of Mountain View, Calif.

Some implementations may be described in the general context of computing system executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine program product discussed below.

Some implementations may also be practiced in distributed computing environments where tasks are performed by remote processing devices that are linked through a communications network. In a distributed computing environment, program modules may be located in both local and remote computer storage media including memory storage devices.

Referring to FIG. 2, the computing system 210 may include, but is not limited to, a processing unit 220 having one or more processing cores, a system memory 230, and a system bus 221 that couples with various system components including the system memory 230 to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing system 210 typically includes a variety of computer program product. Computer program product can be any available media that can be accessed by computing system 210 and includes both volatile and nonvolatile media, removable and non-removable media. By way of example, and not limitation, computer program product may store information such as computer readable instructions, data structures, program modules or other data. Computer storage media include, but are not limited to, RAM, ROM, EEPROM, flash memory or other memory technology. CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 210. Communication media typically embodies computer readable instructions, data structures, or program modules.

The system memory 230 may include computer storage media in the form of volatile and/or nonvolatile memory such as read only memory (ROM) 231 and random-access memory (RAM) 232. A basic input/output system (BIOS) 233, containing the basic routines that help to transfer information between elements within computing system 210, such as during start-up, is typically stored in ROM 231. RAM 232 typically contains data and/or program modules that are immediately accessible to and/or presently being operated on by processing unit 220. By way of example, and not limitation, FIG. 2 also illustrates operating system 234, application programs 235, other program modules 236, and program data 237.

The computing system 210 may also include other removable/non-removable volatile/nonvolatile computer storage media. By way of example only. FIG. 2 also illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2 provide storage of computer readable instructions, data structures, program modules and other data for the computing system 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. The operating system 244, the application programs 245, the other program modules 246, and the program data 247 are given different numeric identification here to illustrate that, at a minimum, they are different copies.

A user may enter commands and information into the computing system 210 through input devices such as a keyboard 262, a microphone 263, and a pointing device 261, such as a mouse, trackball or touch pad or touch screen. Other input devices (not shown) may include a joystick, game pad, scanner, or the like. These and other input devices are often connected to the processing unit 220 through a user input interface 260 that is coupled with the system bus 221, but may be connected by other interface and bus structures, such as a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through an output peripheral interface 290.

The computing system 210 may operate in a networked environment using logical connections to one or more remote computers, such as a remote computer 280. The remote computer 280 may be a personal computer, a hand-held device, a server, a router, a network PC, a peer device or other common network node, and typically includes many or all the elements described above relative to the computing system 210. The logical connections depicted in FIG. 2 include a local area network (LAN) 271 and a wide area network (WAN) 273 but may also include other networks. Such networking environments are commonplace in offices, enterprise-wide computer networks, intranets and the Internet.

When used in a LAN networking environment, the computing system 210 may be connected to the LAN 271 through a network interface or adapter 270. When used in a WAN networking environment, the computing system 210 typically includes a modem 272 or other means for establishing communications over the WAN 273, such as the Internet. The modem 272, which may be internal or external, may be connected to the system bus 221 via the user-input interface 260, or other appropriate mechanism. In a networked environment, program modules depicted relative to the computing system 210, or portions thereof, may be stored in a remote memory storage device. By way of example, and not limitation, FIG. 2 illustrates remote application programs 285 as residing on remote computer 280. It will be appreciated that the network connections shown are exemplary and other means of establishing a communications link between the computers may be used.

It should be noted that some implementations may be carried out on a computing system such as that described with respect to FIG. 2. However, some implementations may be carried out on a server, a computer devoted to message handling, handheld devices, or on a distributed system in which different portions of the present design may be carried out on different parts of the distributed computing system.

Another device that may be coupled with the system bus 221 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 272 may employ a Wireless Application Protocol (WAP) to establish a wireless communication channel. The communication module 272 may implement a wireless networking standard such as Institute of Electrical and Electronics Engineers (IEEE) 802.11 standard, IEEE std. 802.11-1999, published by IEEE in 1999.

Examples of mobile computing systems may be a laptop computer, a tablet computer, a Netbook, a smart phone, a personal digital assistant, or other similar device with on board processing power and wireless communications ability that is powered by a Direct Current (DC) power source that supplies DC voltage to the mobile computing system and that is solely within the mobile computing system and needs to be recharged on a periodic basis, such as a fuel cell or a battery.

Figure 3:
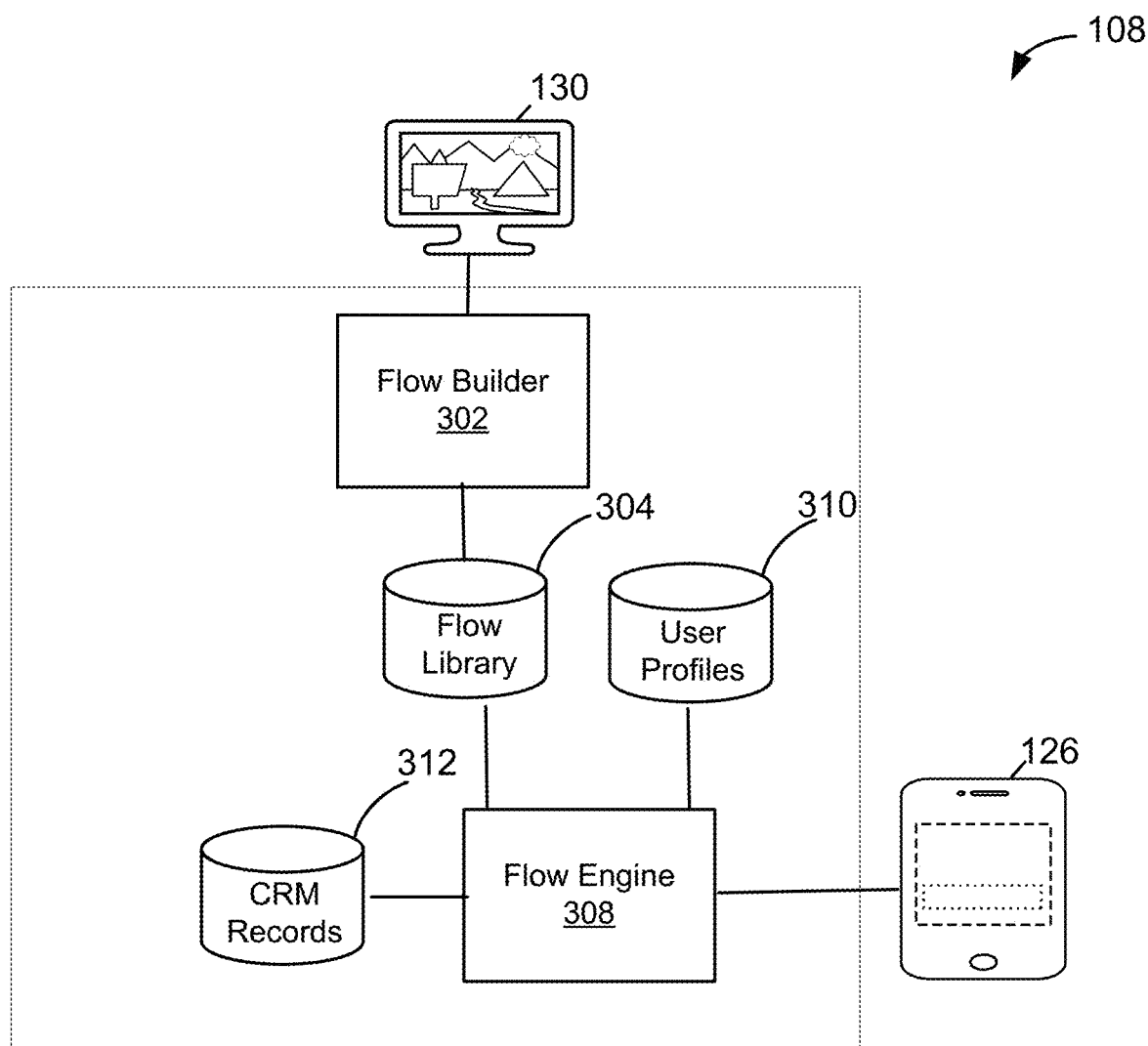
FIG. 3 shows a system diagram of an example of a flow management system 108, in accordance with some implementations

FIG. 3 shows a system diagram of an example of a flow management system 108, in accordance with some implementations. Flow management system 108 can include a flow builder 302 that enables a process flow to be designed and generated using existing elements (e.g., sub-flows) and other components. Flow builder 302 may also be referred to as a layout engine. A user such as an administrator or software developer may access flow builder 302 via computing device 130 to generate or build a process flow represented by a layout. A layout can include one or more elements, where each element corresponds to a set of computer-readable instructions. Flow builder 302 can facilitate the generation of a layout that represents a flow in the form of a plurality of interconnected elements or nodes that each corresponds to a set of computer-readable instructions (e.g., sub-flow) of the flow. As a user interacts with flow builder 302, a layout may be updated in real-time and provided for display via computing device 130, enabling the flow to be easily modified using click-based or drag-and-drop operations.

Once generated, a flow and/or associated layout may be stored in flow library 304. Each flow may be identified by a corresponding flow identifier. A flow may be stored in the form of a file that includes a set of computer-readable instructions. Flows in flow library 304 may be accessed according to their respective flow permissions.

In some implementations, the set of flow permissions associated with a flow are applied to determine whether a user is permitted to access the flow or associated layout. More particularly, the set of flow permissions associated with a flow may be accessed and applied by system 108 to prevent unauthorized access or revisions to the corresponding layout. Similarly, a user profile of a user initiating a flow or for which the flow is initiated may be accessed in response to a request to execute the flow to ascertain whether the user is authorized to execute or otherwise access the flow. In this manner, system 108 can apply a set of flow permissions to a user profile to prevent unauthorized access to flows and corresponding layouts.

Flow engine 308 may manage execution of flows. More particularly, a user may request execution of a flow via computing device 126 or, alternatively, another individual can request execution of the flow on behalf of the user.

Flow engine 308 can access the set of flow permissions associated with the flow and a profile of the user from user profiles 310 to determine whether the user is authorized to execute the flow. Upon determining that the user is authorized to execute the flow, flow engine 308 executes the flow. During execution of the flow, flow engine 308 may execute computer-readable instructions corresponding to elements of the layout representing the flow. In some instances, the order in which elements of the layout are traversed is determined, at least in part, on user selections during execution of the flow.

Database records such as CRM records 312 may be accessed during execution of a flow. Access of a database record can include the performance of a create, update, read, or delete database operation on the database record Access of a database record may result in the updating of the database record or an independent log file.

During execution of the flow, the flow can provide data for presentation via a client device 126 and/or receive data submitted via client device 126. For example, data can be submitted and/or presented via client device 126 in relation to a screen element of the flow. In addition, data generated by the flow can be provided for presentation via client device 126 upon completion of execution of the flow.

Flow builder 302 may be implemented in a variety of contexts. For example, flow builder 302 may be accessed by a software designer or engineer tasked with designing a software program or system. As another example, flow builder 302 may be accessed by an administrator or other individual to design a learning course via an online e-Learning system.

Figure 4A:
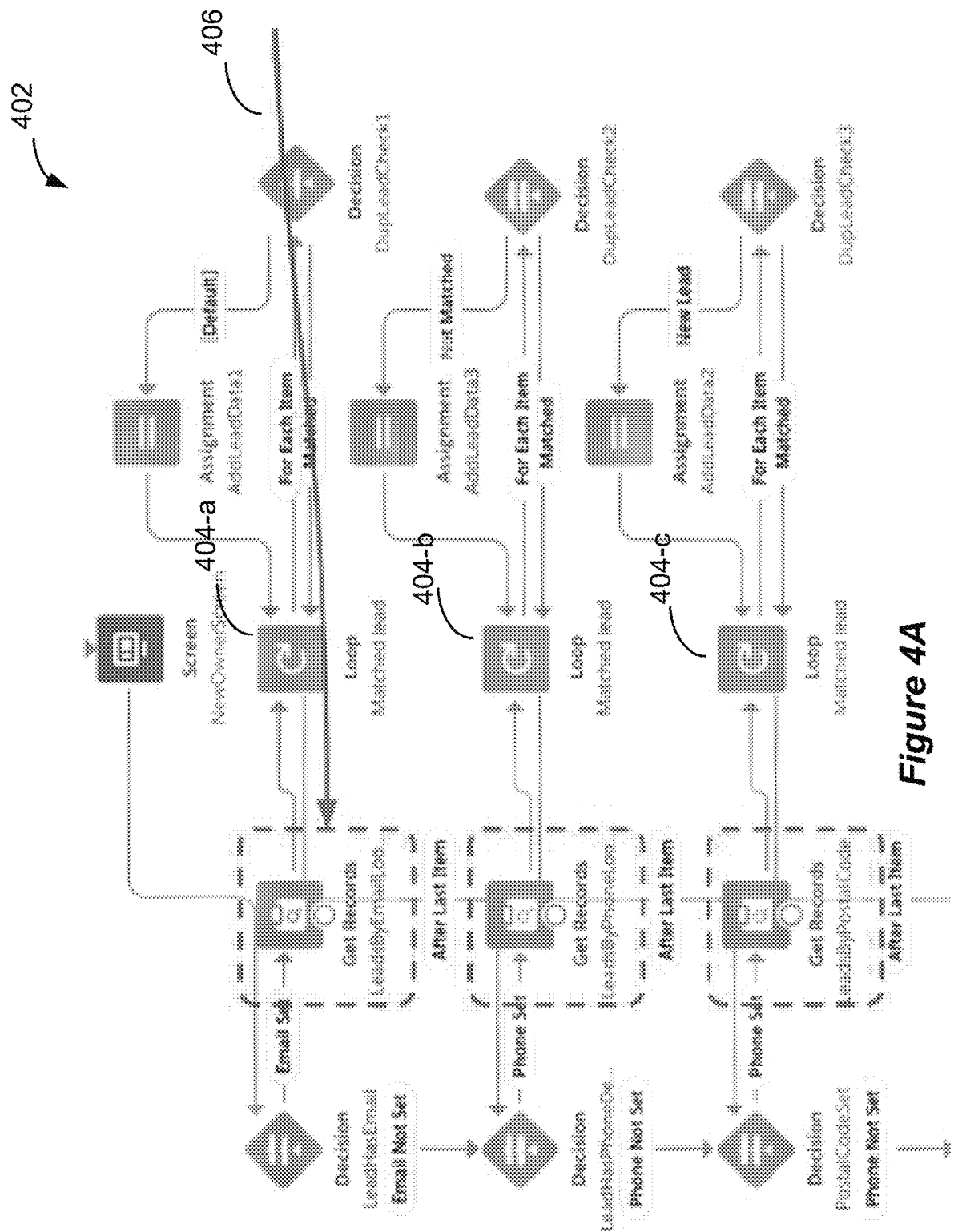
FIG. 4A shows an example of a layout 402 in which loops are represented in a conventional manner.

To illustrate the advantages of the disclosed implementations, a conventional layout is shown and described with reference to FIG. 4A. FIG. 4A shows an example of a layout 402 in which loops are represented in a conventional manner. As shown in this example, loop symbols 404-a, 404-b, 404-c are each associated with a corresponding loop. Elements associated with each loop are represented within layout 402 at varying distances from the respective loop symbol and each such element is connected directly to the loop symbol and/or another element. Some elements of a loop may not be directly connected to the respective loop symbol. Moreover, a single loop may be spread out both horizontally and/or vertically within a layout. In addition, different individuals may have different style preferences for placement of elements of a loop, resulting in a layout that is largely "freeform." For the above reasons, it can be difficult for a user to easily ascertain those elements associated with a particular loop In this example, each element type is represented by a corresponding user interface component. A user interface component may correspond to an operation, which may be associated with a set of computer-readable instructions. For example, a square shaped icon that is orange in color may represent an assignment operation while a square shaped icon that is red in color may represent a Get Records operation. As another example, a diamond shaped icon may represent a decision operation. As yet another example, a Get Records operation represented by a corresponding icon 406 may obtain information from record(s) of a database such as a CRM database. Thus, a sequence of operations represented by a loop may correspond to computer-readable instructions that obtain and process information retrieved from one or more database records.

In accordance with various implementations, a user may log into their account via system 102. The user may then access an application configured to implement a flow builder. Through the flow builder, the user may generate a layout representing a process flow, as will be described in further detail below.

Figure 4B:
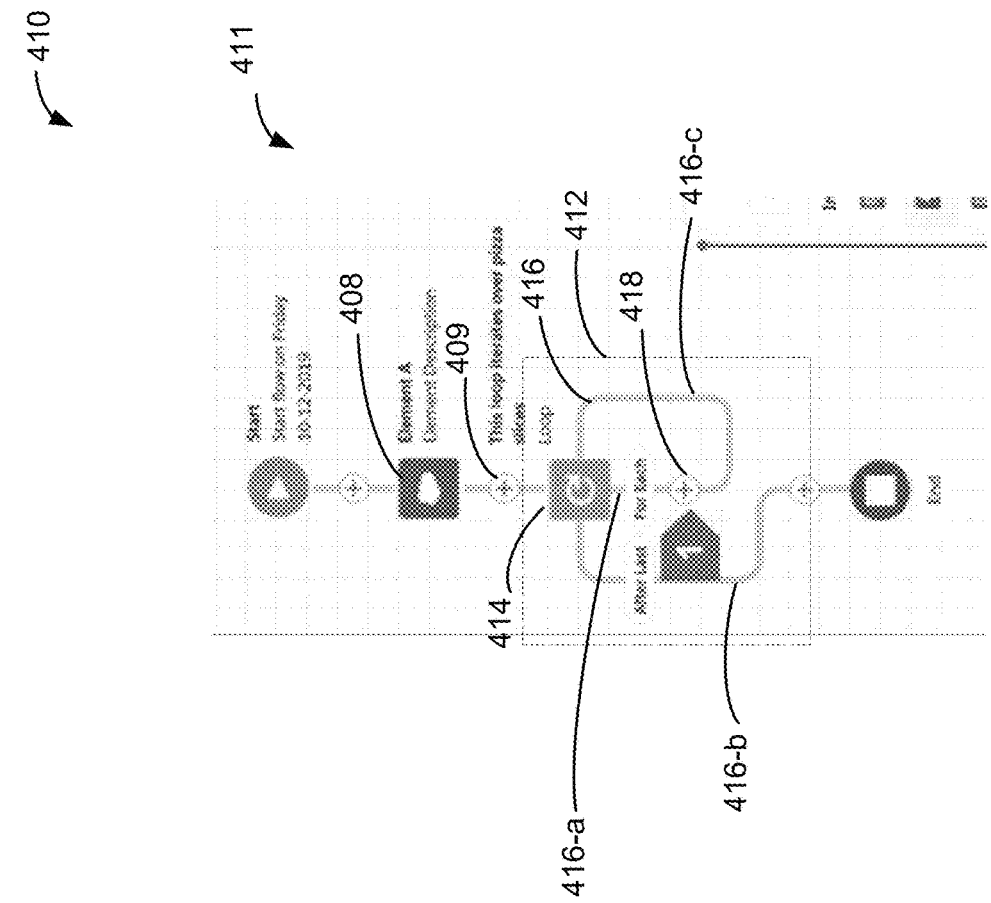
FIG. 4B shows an example of a graphical user interface (GUI) 410 that may be presented by a flow builder in accordance with some implementations.

FIG. 4B shows an example of a graphical user interface (GUI) 410 that may be presented by a flow builder in accordance with some implementations. GUI 410 presents a "canvas" on which a layout 411 is presented. The user may access a previously stored layout or may create a layout from a blank canvas. In this example, layout 411 corresponds to a process flow identified by a flow name, VI.

In some implementations, the user can create and update layout 411 via a click-based interface. In other implementations, the user can perform a drag-and-drop operation to drag a selected element type to a desired location within layout 411. Examples of types of elements that the user can add to layout 411 are shown at 407.

In accordance with various implementations, locations at which elements are permitted to be added within the canvas are designated by specific add indicators. Stated another way, an add indicator can designate a position within a layout at which an element can be added. The position may be relational (e.g., indicating a position in relation to other elements or components within the layout) rather than absolute. As will be shown and described in further detail below, an add indicator may be designated by an icon or symbol such as a "+" symbol. A user may specify or indicate a location at which an element is to be added by selecting or interacting with a corresponding add indicator. An add indicator may also be referred to as an add element user interface (UI) component.

As will be described in further detail below, an element and associated connectors may be automatically positioned within the canvas responsive to a user's selection of the element (or element type). Since a user is not permitted to manually position elements or connectors associated with elements within the canvas, layout 411 is generated in a consistent manner.

In this example, the user has elected to add a loop element 412 to layout 411. The layout engine automatically formats and positions loop element 412 such that it is connected to element 408. In addition, an add element UI component 409 is automatically generated such that it is rendered between element 408 and loop element 412, enabling additional elements to be added between element 408 and loop element 412.

As shown in FIG. 4B, loop element 412 comprises a loop symbol 414 and a loop connector path 416 that is connected to loop symbol 416. As shown in this example, loop connector path 416 may include an internal, middle portion 416-a and external portions 416-b, 416-c. External portions 416-b, 416-c are parallel to middle portion 416-a and may be approximately equal in length to middle portion 416-a. In addition, external portions 416-b, 416-c may be equidistant from middle portion 416-a. In this example, external portions include a left portion 416-b and a right portion 416-c. However, in other implementations, a loop may flow in a horizontal rather than a vertical direction. For example, loop element 412 may be rotated 90 degrees either clockwise or counter clockwise.

Loop element 412 may represent computer-readable instructions that are configured to iterate over elements that are added to loop element 412. Text "for each" may be rendered at the beginning of loop element 412 (e.g., after loop symbol 412). The language "for each" represents the iteration over elements in loop element 412. In addition, text "after last" may be rendered at the end of loop element 412 to represent that any subsequent elements are not part of loop element 412 and the corresponding iteration that is performed.

In some implementations, loop element 412 includes add element UI component 418, which designates a location in loop element 412 at which at which an additional element can be added to the loop. In this example, an add element UI component 418 operates as a button. A user can submit a request to add an element to loop element 412 by interacting with add element UI component 418 rendered within loop element 412. As shown in this example, add element UI component 418 may be rendered on middle portion 416-a of loop element 412. A set of spacing rules may be applied to generate and expand loop element 412 as elements are added to loop element 412, as will be described in further detail below.

Figure 4C:
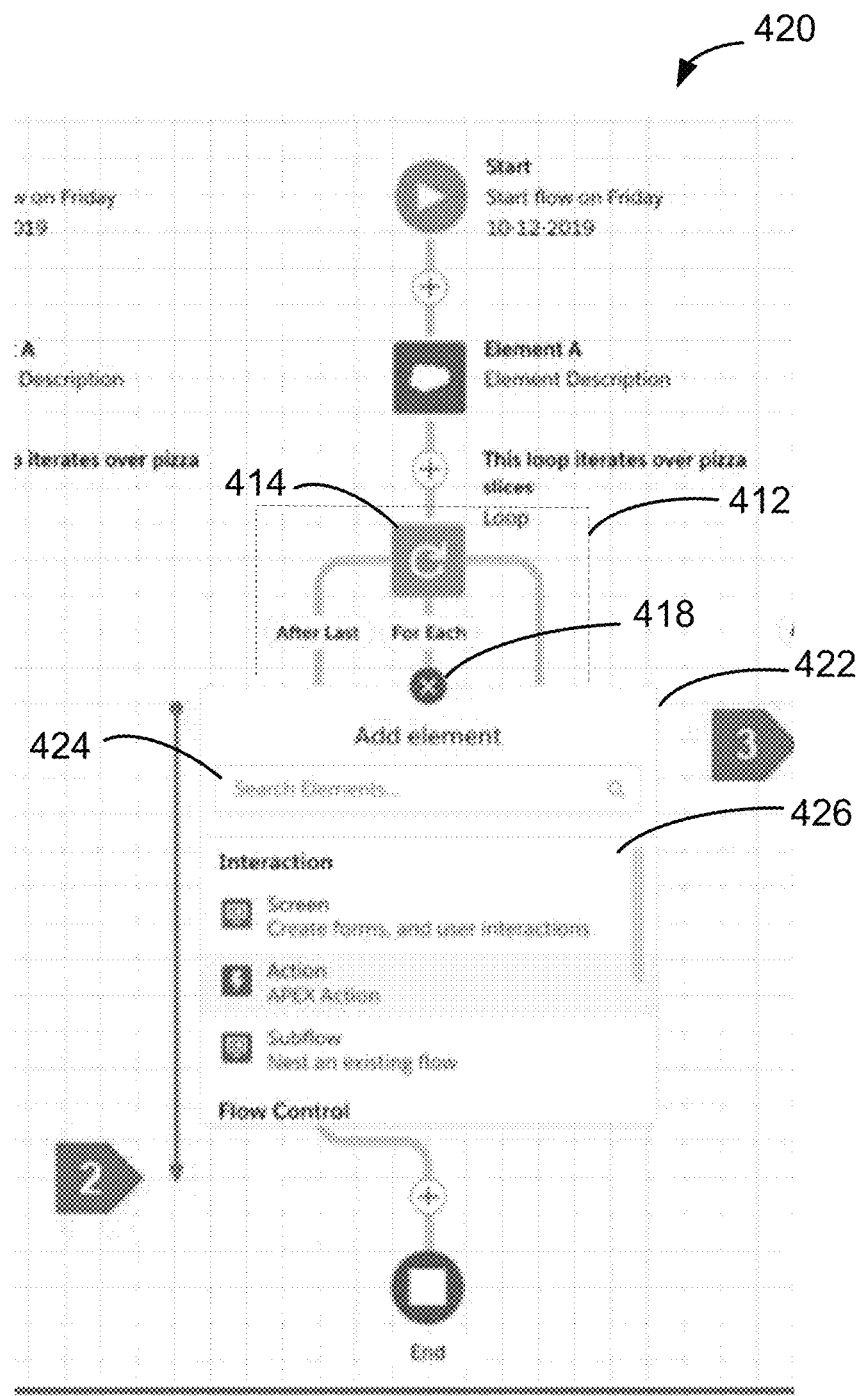
FIG. 4C shows an example of a layout 420 in which a loop element is updated in accordance with some implementations.

When a user selects or interacts with add element UI component 418 (e.g., by clicking on add element UI component 418), the layout engine provides an add element interface for presentation by the client device. FIG. 4C shows an example of a layout 420 in which a loop element is updated in accordance with some implementations. As shown in this example, responsive to receiving an indication of selection of add element UI component 418, an add element interface 422 that enables elements to be added to loop element 412 may be presented. Add element interface 422 can include a menu or other UI configured to enable a user to submit or select an element type for which an element is to be added at the location of the corresponding add element UI component 418.

The user may submit a search query via input text box 424 of add element interface 422 to locate an element type. Alternatively, the user may select an element type from add element menu 426 of add element interface 422 to add an instance of the element type to loop element 412. The user may click on a save user interface element (not shown to simplify illustration) or toggle add element UI component 418 to confirm and save their selection. A user may also add text associated with the added element. For example, the user may label the added element "Element B." Alternatively, the label may be auto-generated. A label associated with an element may be represented horizontally such that it does not overlap the corresponding element.

In some implementations, add element interface 422 is presented such that any existing elements of loop element 412 remain visible. For example, loop element 412 may be expanded along at least one axis (e.g., downward) so that any existing elements of loop element 412 are visible above or below add element interface 422. In this example, the user has selected Apex action type from add element interface 422. The user may close add element interface 422 by selecting (e.g., clicking on) add element UI component 418. Upon toggling add element UI component 418, add element interface 422 is closed and loop element 412 may be automatically contracted to previous or reduced dimensions based, at least in part, on any elements that have been added to loop element 412.

Figure 4D:
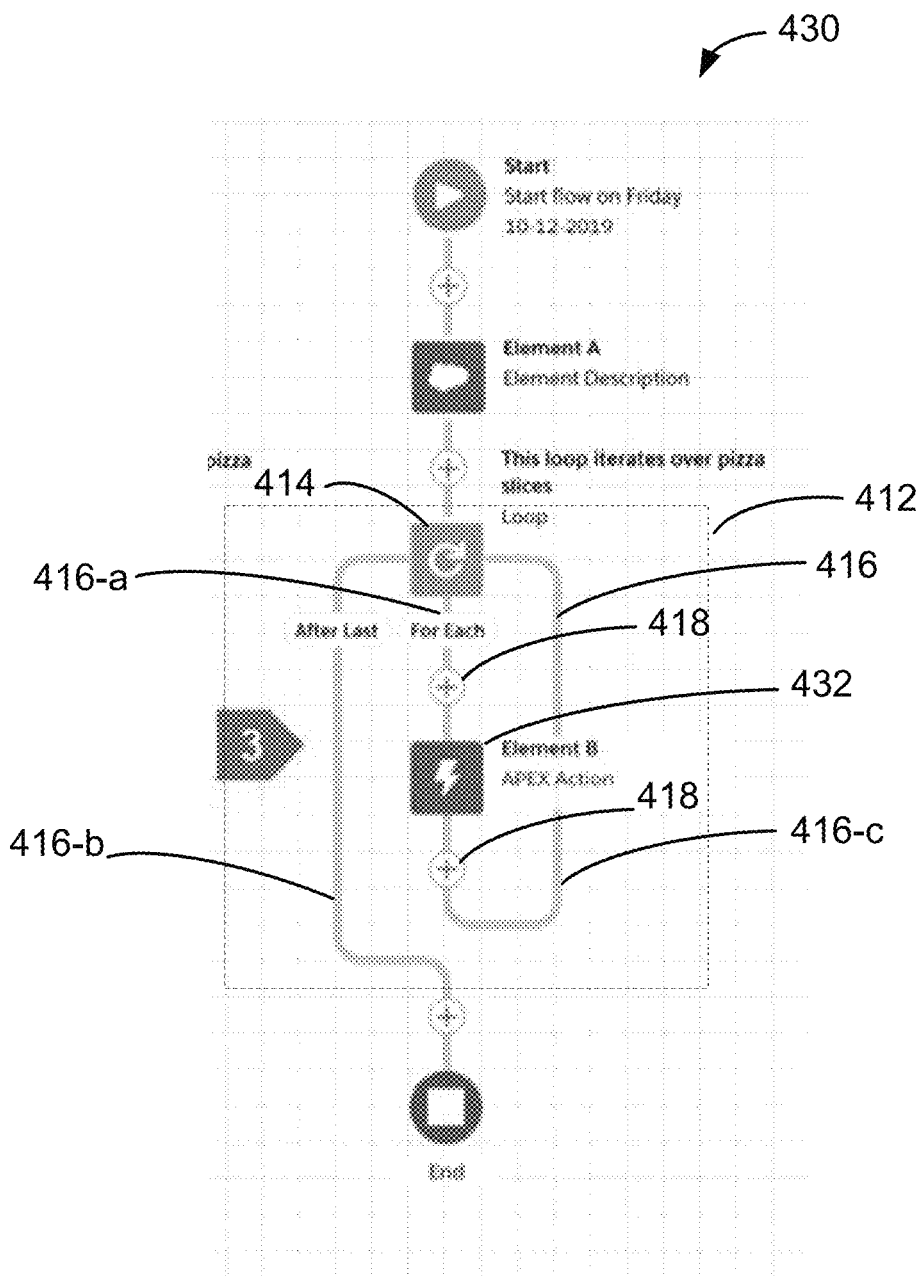
FIG. 4D shows an example of a layout 430 including a loop element that has been updated to include a user-selected element in accordance with some implementations.

FIG. 4D shows an example of a layout 430 including a loop element that has been updated to include a user-selected element in accordance with some implementations. Responsive to the user's selection of the Apex action type in FIG. 4C, an instance of an Apex action type is added by the Flow Builder as Element B 432 to loop element 412. In addition, Flow Builder modifies loop element 412 such that an add element UI component 418 is presented both prior and subsequent to the added element, element B 432.

As shown in this example, loop element 412 is automatically expanded to include the added element, Element B 432. In addition, loop element 412 is automatically expanded in conjunction with presenting an add element UI component 418 both prior and subsequent to the added element, Element B 432. In this example, the added element, Element B 432, is positioned subsequent to (e.g., below) the pre-existing add element UI component 418 and an additional add element UI component 418 is presented subsequent to (e.g., below) the added element, Element B 432. Thus, loop element 412 may be expanded along the vertical axis (and/or horizontal axis) to include the added element and an additional add element UI component 418.

Figure 4E:
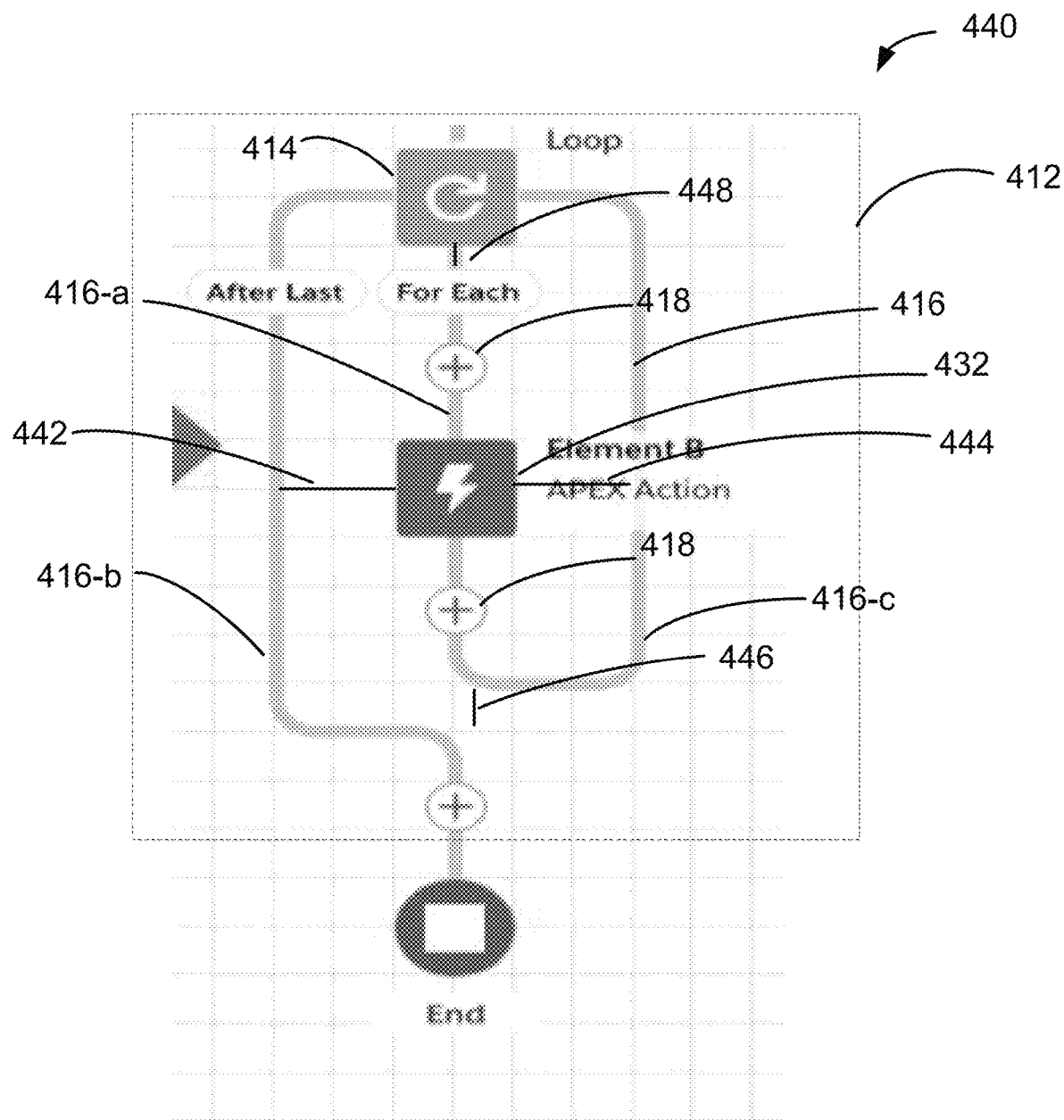
FIG. 4E shows an example of the application of a set of spacing rules to a layout 440 in accordance with some implementations.

FIG. 4E shows an example of the application of a set of spacing rules to a layout 440 in accordance with some implementations. In accordance with some implementations, a layout engine may automatically generate and rearrange components including elements and connectors within the layout responsive to click-based user input. This may be accomplished, in part, through the use of a set of spacing rules. For example, the set of spacing rules can include rule(s) that are specific to the loop element type.

In accordance with various implementations, a baseline grid representing a virtual grid of units is used to automatically position elements and connectors within a layout. In some implementations, the minimum unit size is 48 pixels. In other implementations, the minimum unit size is 24 pixels.

The set of spacing rules may dictate pertinent spacing margins to be applied by the layout engine during the generation or updating of loop elements. Referring to FIG. 4E, such spacing distances can include, for example, one or more of: 1) a distance 442 between external connector portion 416-b and loop element 432 of loop element 412; 2) a distance 444 between external connector portion 416-c and loop element 432 of loop element 432; 3) a distance 446 between external connector portion 416-*c* and external connector portion 416-*b*; or 4) a distance 448 between loop symbol 414 and the "for each" label of loop element 432. In this example, loop element 432 is traversed vertically and distances 442 and 444 are horizontal distances, while distances 446 and 448 are vertical distances. In other implementations, where loop element 432 is traversed horizontally, distances 442 and 444 will be vertical distances while distances 446 and 448 will be horizontal distances.

In some implementations, distances 442 and 444 are each equal to 48 pixels, distance 446 is 24 pixels, and distance 448 is 12 pixels. While the set of spacing rules described in these examples define specific constant values, the set of spacing rules may also be defined via the use of formulas. In this manner, margins that separate elements and connectors from one another maybe defined through a set of spacing rules.

It is important to note that these examples are merely illustrative and other margins or spacing rules may be applied in association with the loop element or other types of elements. More particularly, the set of spacing rules may also dictate other distances, such as distances between add element UI components 418 and elements, distances between add element UI components 418 and labels (e.g., "for each" label), and/or other distances associated with the loop element 432.

The set of spacing rules may also dictate minimum or specific margins between connectors and/or elements external to loop element 413. For example, each external connector 416-*b*, 416-*c* of loop element 432 may have an associated margin (e.g., 48 pixels) that surrounds the connector. Thus, any element or connector external to loop element 432 may be separated from loop connector path 416 of loop element 432 by the margin (at a minimum).

Figure 4F:
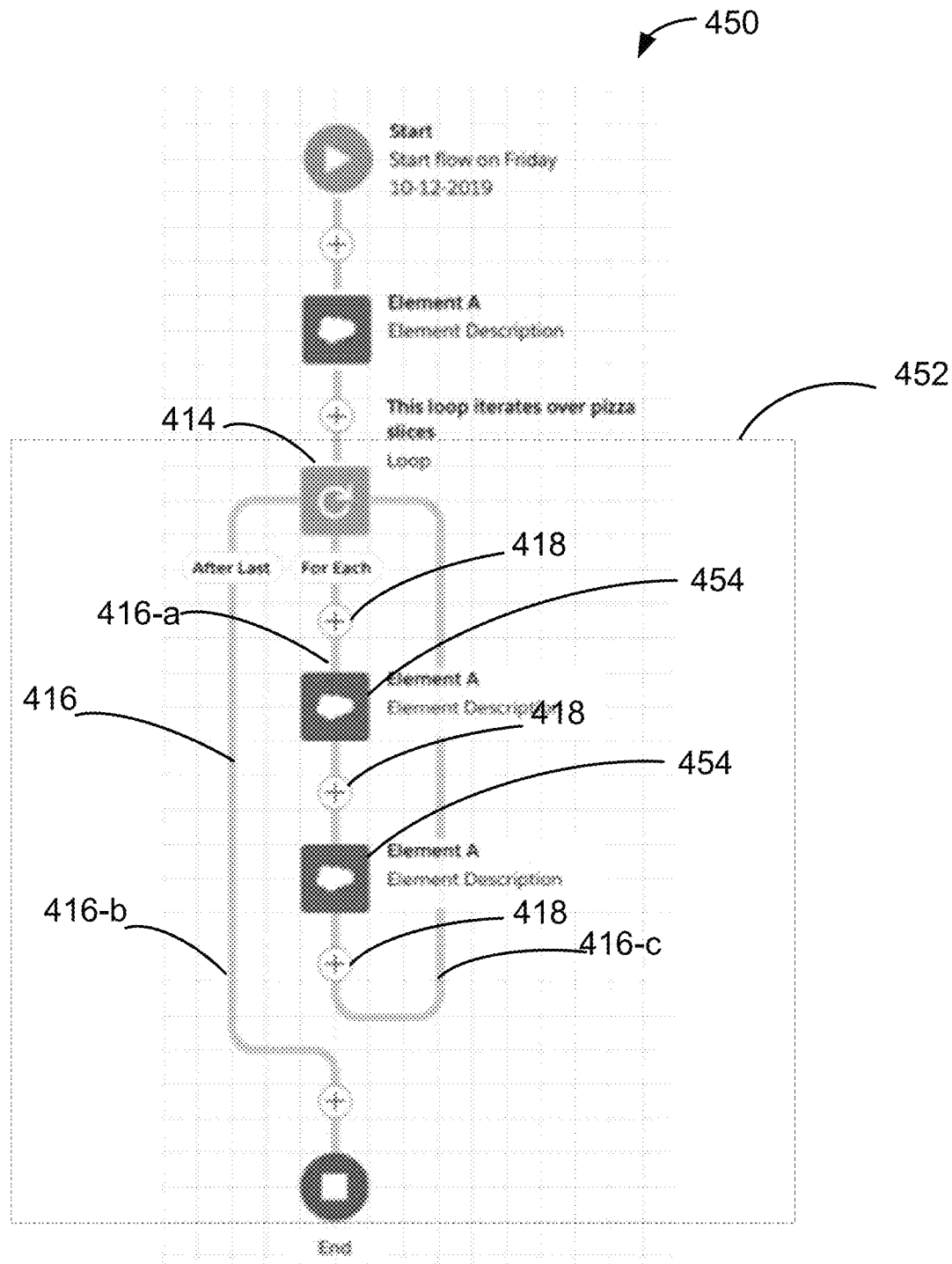
FIG. 4F shows a layout 450 including an example of an expanded loop element generated in accordance with some implementations.

FIG. 4F shows a layout 450 including an example of an expanded loop element generated in accordance with some implementations. Loop element 452 is automatically expanded as additional elements are added. In this example, loop element 452 is automatically expanded to include two instances of Element A 454. As shown in this example, loop element 452 and associated loop connector path 416 are expanded vertically to encompass both instances of Element A 45. More particularly, loop element 451 and loop connector path 416 are expanded such that an add element UI component 418 is presented both prior to and subsequent to each instance of Element A 454. Thus, an additional element may be added to loop element 452 at any point in loop element 452 via an add element UI component 418.

Figure 4G:
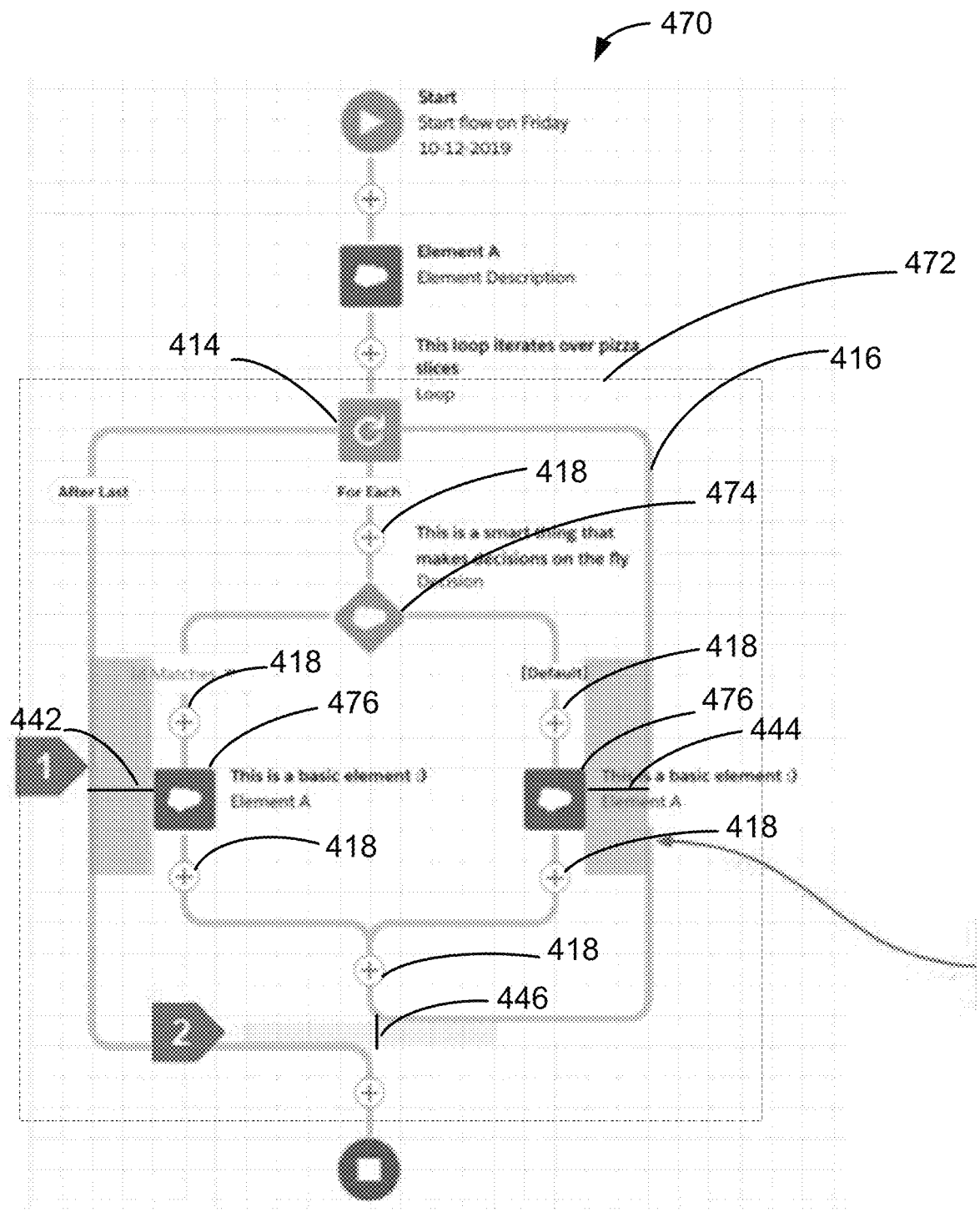
FIG. 4G shows a layout 470 including an example of an expanded loop element containing a nested decision in accordance with some implementations.

FIG. 4G shows a layout 470 including an example of an expanded loop element containing a nested decision in accordance with some implementations. Loop element 472 is automatically expanded to include a decision element 474 responsive to a user's selection of a decision element type. As shown in this example, loop element 472 is further expanded as elements 476 are added to embedded decision element 474. More particularly, loop element 472 and associated loop connector path 416 are expanded such that the width of loop element 472 and loop connector path 416 is increased. Automatic expansion of loop element 472 is performed such that an instance of add element UI component is rendered before and after each element of loop element 472 and each element of decision element 474. Spacing rules are automatically applied as loop element 472 is expanded.

Figure 5:
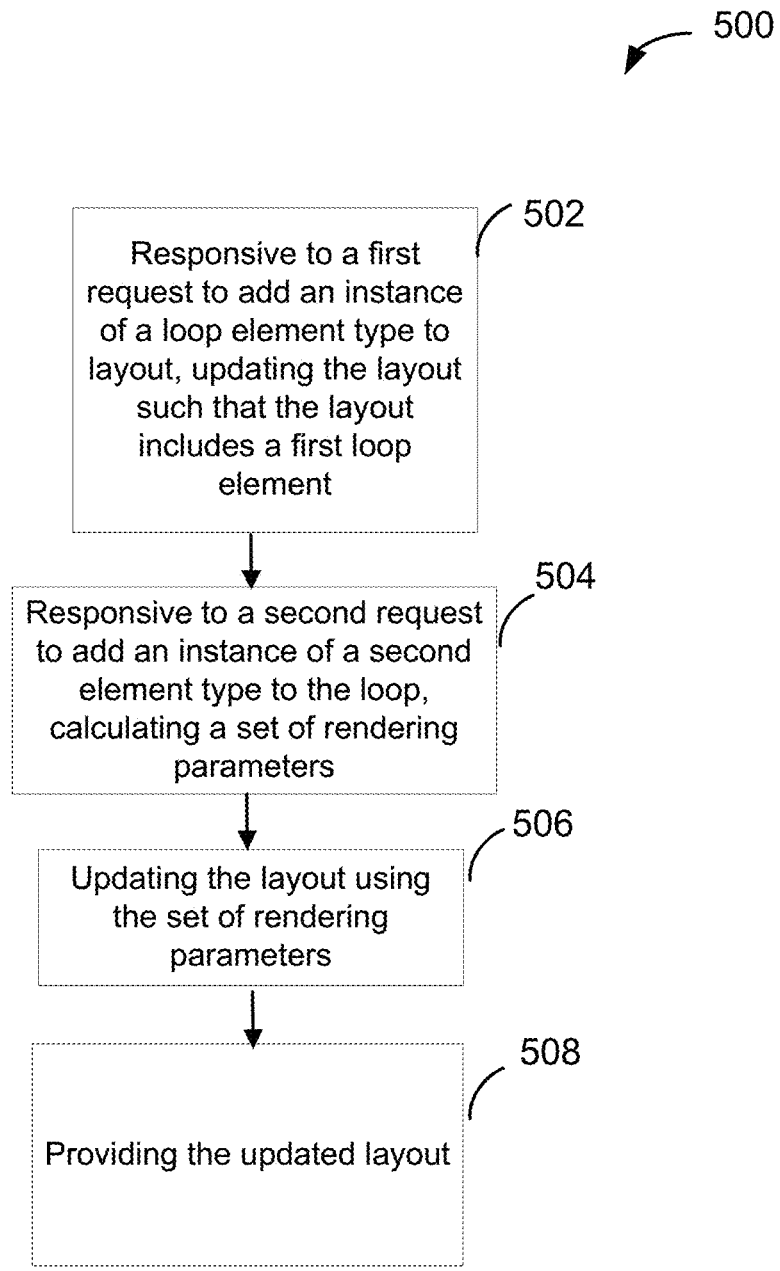
FIG. 5 shows a process flow diagram illustrating an example of a process for dynamically expanding a loop element in accordance with some implementations.

FIG. 5 shows a process flow diagram illustrating an example of a process for dynamically expanding a loop element in accordance with some implementations. In accordance with various implementations, a user may navigate and modify a layout entirely using a keyboard. Specifically, a user may navigate within the layout, add elements, remove elements, and replace elements through the use of a keyboard. This feature may be referred to as "click-to-create."

In some implementations, a user may add or update a loop element without having to drag the loop to a canvas from a panel. This increases the speed with which a user can create or modify a loop within a layout. In addition, through the implementation of a set of spacing rules, a set of connectors may be automatically generated or updated. Through the use of a novel loop structure and consistent spacing, a loop element may be easily interpreted by a user viewing the layout.

A user may access an application implementing a layout engine associated with a flow builder, which presents a canvas for generating a layout representing a process flow. The user may submit, via a client device, a first request to add an instance of a loop element type to a layout (e.g., canvas) represented in a graphical user interface (GUI). For example, the user may click on a user interface component representing a loop element type via a menu presented by the application. In some instances, the menu is an add element user interface presented responsive to interaction with an add element UI component. As described above, an add element UI component may be represented by an icon such as a "+" symbol within the layout. In this manner, the user may indicate a position in the layout at which an instance of a loop element type is to be added.

Responsive to the first request from the client device to add an instance of a loop element type to the layout represented in the GUI, the layout engine automatically updates the layout such that the layout includes a first loop element defined by a loop element symbol and a loop connector path connected to the loop symbol at 502. In other words, a loop is added to the layout without enabling the user to position connector(s) associated with the loop. In some implementations, the layout engine automatically positions the first loop element within the layout such that a loop symbol of the first loop element is positioned at the location (e.g., of an add element UI component) indicated by the user in the first request.

In some implementations, a layout engine automatically positions element(s) and/or connectors within the layout according to the set of spacing rules. As additional elements are added by the user or other users via the application, the layout engine may automatically reformat the layout or a portion thereof based, at least in part, on the set of spacing rules.

In some implementations, the layout engine maintains a data structure that stores a representation of the layout. The representation may represent the layout within the context of a virtual grid. More particularly, each element, connector, UI component, and/or associated text may be represented, as well as pertinent margins associated with the corresponding element, connector, UI component, and/or text. Through the use of the representation, the layout engine may easily determine which space is "vacant" or available within the canvas.

In some implementations, a representation of the layout can be stored and subsequently retrieved by the layout engine, enabling the layout to be accessed at a later time by the client device or a different client device. The user or another user may submit a second request to add an instance of a second element type to the first loop element. The second request may be received from the client device or another client device.

The layout including the first loop element may be provided for presentation via a display by a client device. In some implementations, the first loop element includes a first add element user interface (UI) component. Responsive to an indication of user selection of the first add element UI component, the layout engine can provide an add element user interface configured to provide at least one input mechanism that enables a user to select an element type to be added to the loop.

The layout engine receives a second request to add an instance of a second element type to the first loop element. For example, the second request may be received from the client device or a second client device. More particularly, an indication of selection of a desired element type (e.g., a second element type) to be added to the loop may be submitted by a user via the input mechanism. Responsive to the second request to add an instance of the second element type to the first loop element, the layout engine calculates a set of rendering parameters for at least a portion of the layout including the first loop element based, at least in part, on a set of spacing rules and a set of dimensions associated with the second element type at 504. For example, dimensions associated with a decision element type may have different dimensions than those associated with a particular sub-flow element type.

The set of spacing rules can include rule(s) that are specific to a particular element type. For example, the set of spacing rules can include one or more rules associated with the loop element type, a decision element type, and/or other element types. For each element type, the corresponding rule(s) may define a minimum or specific margin to be maintained for a corresponding element, connector, UI component (e.g., add UI component), and/or text. For example, the set of spacing rules may indicate a particular margin to maintain in association with the loop connector path or a portion thereof. In some implementations, the set of spacing rules includes rule(s) that are agnostic to element type.

The set of rendering parameters may indicate a first set of coordinates associated with the expanded first loop element. For example, the first set of coordinates may define the position of a loop symbol, as well as the position of an extended loop connector path. Coordinates may include two-dimensional or three-dimensional coordinates.

In some instances, the layout engine re-positions elements and/or associated connectors in the layout to prevent collisions or obstruction of elements or associated connectors, as well as associated text. Thus, the set of rendering parameters may include a second set of coordinates associated with a third element external to the first loop element and/or with a connector external to the first loop element.

The layout engine automatically updates the portion of the layout using the set of rendering parameters such that an updated layout is generated at 506. As described above, the layout is updated such that the first loop element is automatically expanded to include an instance of the selected element type. After expansion, the updated layout includes an expanded first loop element that is represented by both the loop symbol and an expanded loop connector path on which a second element of the second element type is positioned, where the expanded loop connector path is connected to the loop symbol. In this manner, the loop element and loop connector path are expanded to encompass the second element. As described above, the second element may be positioned within the expanded loop element such that it is positioned on an internal portion of the expanded loop connector path. Expansion of the first loop element is performed such that the first and second external portions of the expanded loop connector path together encompass the second element.

In some implementations, the expanded first loop element includes the first add element UI component that was previously presented within the first loop element, as well as a second add element UI component. As shown and described above, the first add element UI component and second add element UI component may be separated by the second element and may be equidistant from the second element. For example, the first add element UI component and second add element UI component may be presented such that they are positioned on the internal connector of the loop connector path. A user may interact with either of the add element UI components to add an additional element to the expanded first loop element such that computer-readable instructions corresponding to the additional element will be traversed either prior to or subsequent to the second element. For example, where the expanded loop element is traversed vertically, the first and second add element UI components may be presented such that one is above and the other is below the second element. As another example, where the expanded loop element is traversed horizontally, the first and second add element UI components may be presented such that one is to the left and the other is to the right of the second element. Therefore, the disclosed implementations may be applied to a layout having any orientation.

The updated layout may then be provided to the client device at 508. For example, the updated layout may be transmitted to the client device for rendering via a GUI. In some implementations, the updated layout may be provided in a file such as a pdf file.

The updated layout may be stored in a file that enables the updated layout to be modified by users having permission to edit the associated layout. In some implementations, the file may have associated permissions that indicate users having permission to access and/or modify the updated layout.

While the above-disclosed implementations are described with reference to a loop element, these examples are merely illustrative. Therefore, the implementations may also be applied to other types of elements such as a decision or other form of branching element.

Some but not all of the techniques described or referenced herein are implemented using or in conjunction with a database system. Salesforce.com, inc, is a provider of customer relationship management (CRM) services and other database management services, which can be accessed and used in conjunction with the techniques disclosed herein in some implementations. In some but not all implementations, services can be provided in a cloud computing environment, for example, in the context of a multi-tenant database system. Thus, some of the disclosed techniques can be implemented without having to install software locally, that is, on computing devices of users interacting with services available through the cloud. Some of the disclosed techniques can be implemented via an application installed on computing devices of users.

Information stored in a database record can include various types of data including character-based data, audio data, image data, animated images, and/or video data. A database record can store one or more files, which can include text, presentations, documents, multimedia files, and the like. Data retrieved from a database can be presented via a computing device. For example, visual data can be displayed in a graphical user interface (GUI) on a display device such as the display of the computing device. In some but not all implementations, the disclosed methods, apparatus, systems, and computer program products may be configured or designed for use in a multi-tenant database environment.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

Some non-limiting examples of systems, apparatus, and methods are described below for implementing database systems and enterprise level social networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

Figure 6A:
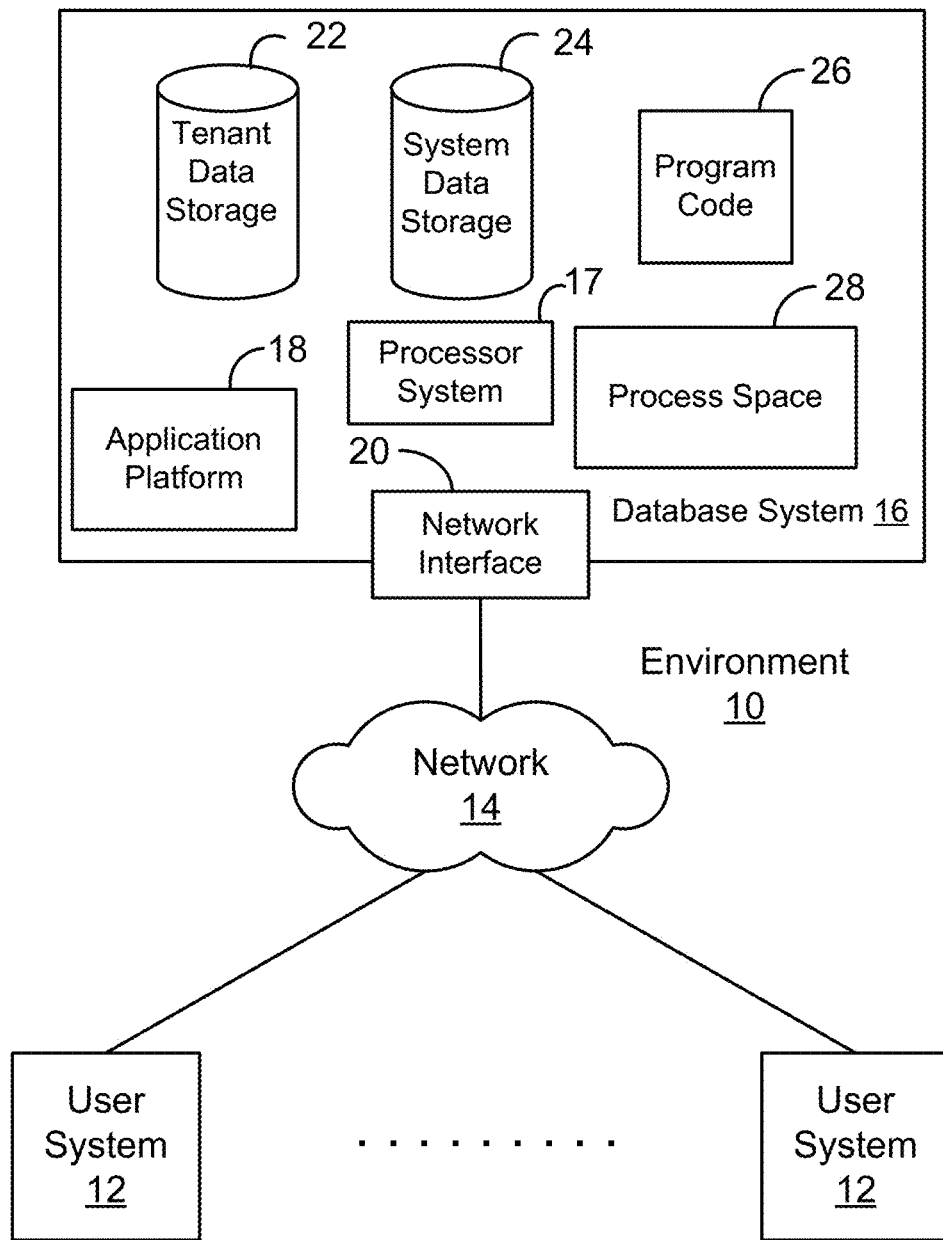
FIG. 6A shows a block diagram of an example of an environment 10 in which an on-demand database service can be used in accordance with some implementations.

FIG. 6A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 6A (and in more detail in FIG. 6B) user systems 12 might interact via a network 14 with an on-demand database service, which is implemented in the example of FIG. 6A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data: however, other alternative configurations may be used instead.

In one implementation, system 16, shown in FIG. 6A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 7A:
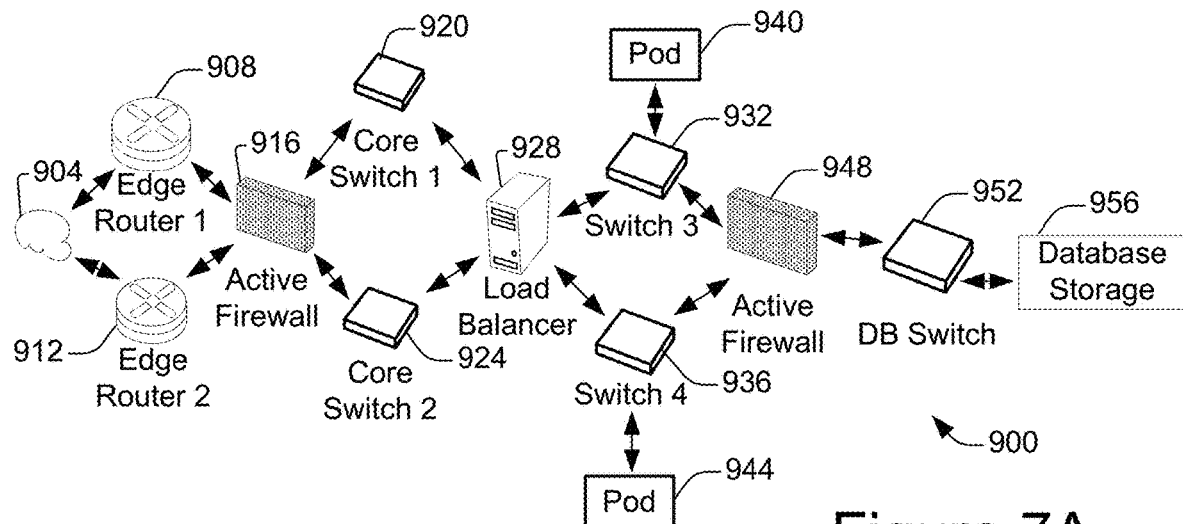
FIG. 7A shows a system diagram of an example of architectural components of an on-demand database service environment 900, in accordance with some implementations.
Figure 7B:
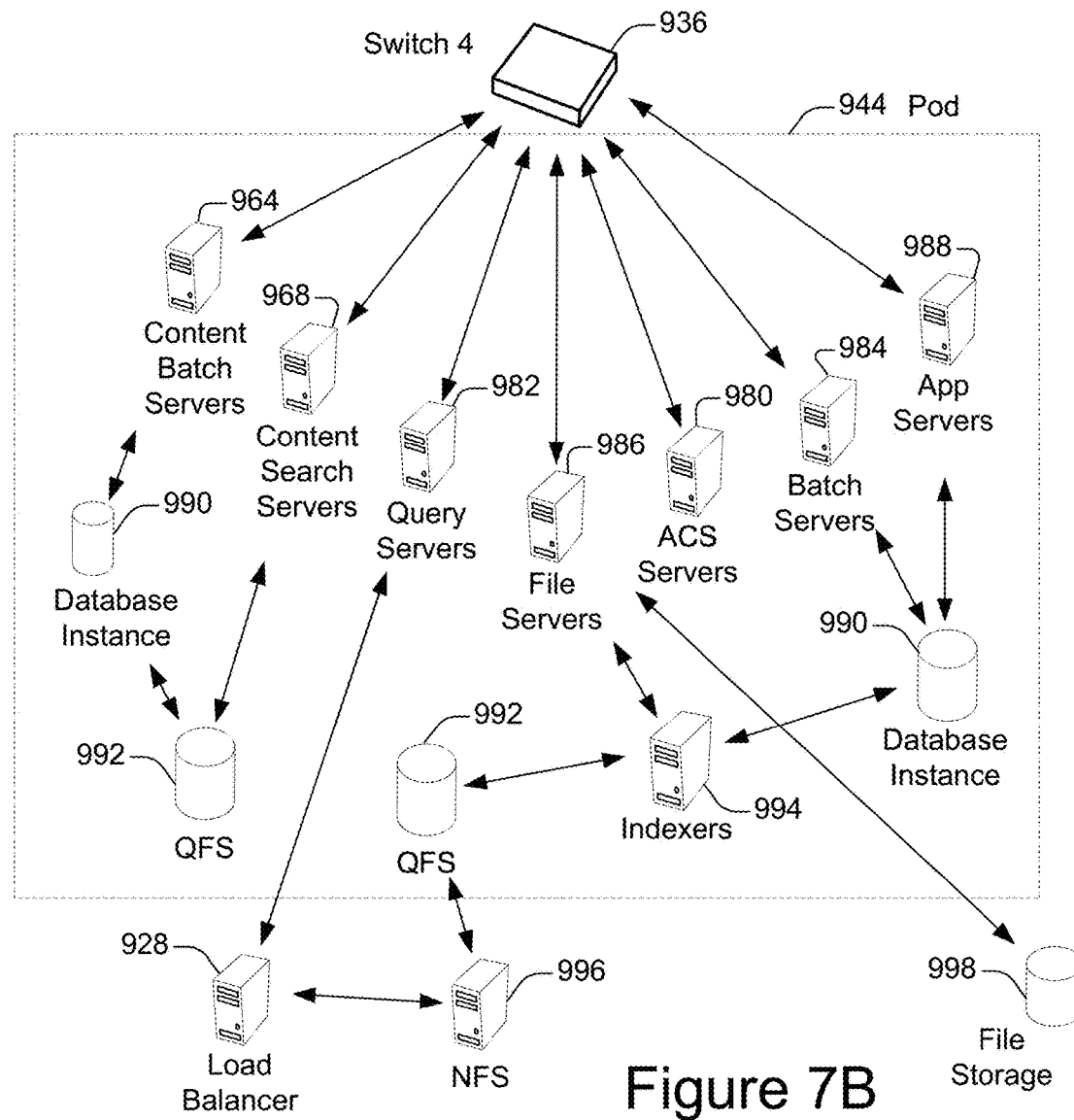
FIG. 7B shows a system diagram further illustrating an example of architectural components of an on-demand database service environment, in accordance with some implementations.

One arrangement for elements of system 16 is shown in FIGS. 7A and 7B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 6A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client. e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus. "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP. HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 6B:
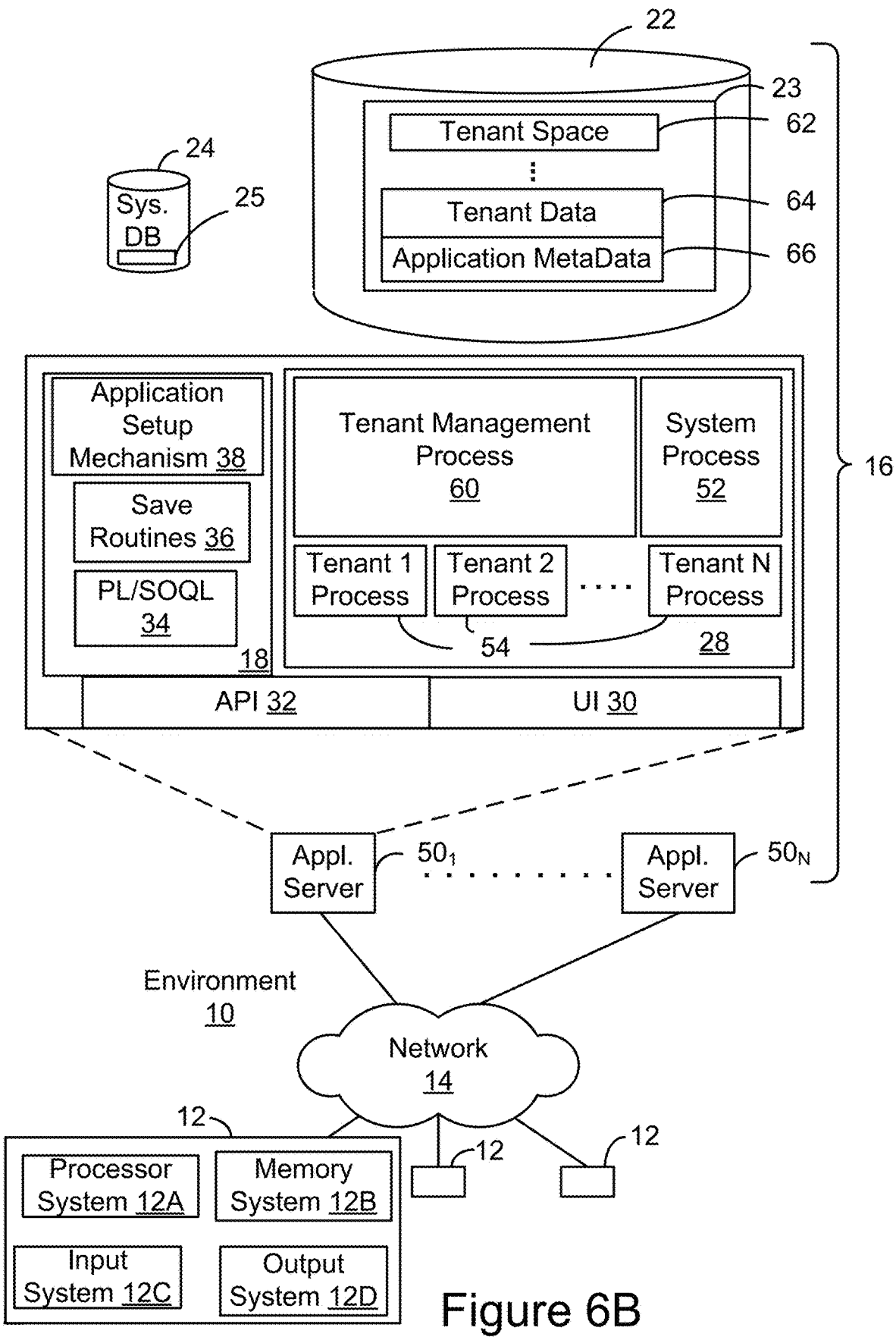
FIG. 6B shows a block diagram of an example of some implementations of elements of FIG. 6A and various possible interconnections between these elements.

FIG. 6B shows a block diagram of an example of some implementations of elements of FIG. 6A and various possible interconnections between these elements. That is, FIG. 6B also illustrates environment 10. However, in FIG. 6B elements of system 16 and various interconnections in some implementations are further illustrated. FIG. 6B shows that user system 12 may include processor system 12A, memory system 12B, input system 12C, and output system 12D. FIG. 6B shows network 14 and system 16. FIG. 6B also shows that system 16 may include tenant data storage 22, tenant data 23, system data storage 24, system data 25. User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 6A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 6B, system 16 may include a network interface 20 (of FIG. 6A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle, databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 7A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

As shown in FIGS. 7A and 7B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 7A and 7B, some implementations of an on-demand database service environment may include anywhere from one to many devices of each type. Also, the on-demand database service environment need not include each device shown in FIGS. 7A and 7B, or may include additional devices not shown in FIGS. 7A and 7B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 7B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 7A and 7B.

FIG. 7B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

In some implementations, one or more application servers or other servers described above with reference to FIGS. 7A and 7B include a hardware and/or software framework configurable to execute procedures using programs, routines, scripts, etc. Thus, in some implementations, one or more of application servers $50_1$-$50_N$ of FIG. 7B can be configured to initiate performance of one or more of the operations described above by instructing another computing device to perform an operation. In some implementations, one or more application servers $50_1$-$50_N$ carry out, either partially or entirely, one or more of the disclosed operations. In some implementations, app servers 988 of FIG. 7B support the construction of applications provided by the on-demand database service environment 900 via the pod 944. Thus, an app server 988 may include a hardware and/or software framework configurable to execute procedures to partially or entirely carry out or instruct another computing device to carry out one or more operations disclosed herein. In alternative implementations, two or more app servers 988 may cooperate to perform or cause performance of such operations. Any of the databases and other storage facilities described above with reference to FIGS. 6A, 6B, 7A and 7B can be configured to store lists, articles, documents, records, files, and other objects for implementing the operations described above. For instance, lists of available communication channels associated with share actions for sharing a type of data item can be maintained in tenant data storage 22 and/or system data storage 24 of FIGS. 7A and 7B. By the same token, lists of default or designated channels for particular share actions can be maintained in storage 22 and/or storage 24. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 6A, 6B, 7A and 7B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD): magneto-optical media; and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. A method, comprising:

responsive to a first request from a client device to add an instance of a loop element type to a layout represented in a graphical user interface (GUI), updating, by a processor, the layout by adding a first loop element to the layout, the first loop element being defined by a loop element symbol and a loop connector path connected to the loop symbol, the first loop element corresponding to and representing a first set of computer-readable instructions configured to iterate over computer-readable instructions corresponding to elements added to the first loop element;

responsive to a second request to add an instance of a second element type to the first loop element, calculating, by the processor, a set of rendering parameters for a portion of the layout including the first loop element using a set of spacing rules and a set of dimensions associated with the second element type, the instance of the second element type corresponding to and representing a second set of computer-readable instructions;

generating, by the processor, an updated layout by applying the set of rendering parameters to the portion of the layout, the updated layout including an expanded first loop element defined by the loop symbol and an expanded loop connector path on which a second element of the second element type is positioned, the expanded loop connector path being connected to the loop symbol, the set of rendering parameters indicating a first set of coordinates associated with the expanded first loop element; and outputting, by the processor, the updated layout.

2. The method as recited in claim 1, the set of rendering parameters indicating a first set of coordinates associated with the expanded first loop element and a second set of coordinates associated with at least one of: a third element external to the first loop element or a connector external to the first loop element.

3. The method as recited in claim 1, the set of spacing rules including one or more rules associated with the loop element type.

4. The method as recited in claim 1, the first loop element including a first add element user interface (UI) component, the method further comprising:

responsive to an indication of user selection of the first add element UI component, generating an add element user interface including at least one input mechanism, an indication of selection of the second element type being received via the input mechanism.

5. The method as recited in claim 1, the expanded first loop element including two add element UI components, each add element UI component being configured to provide at least one input mechanism, the add element UI components being separated by the second element and being equidistant from the second element.

6. The method as recited in claim 1, the set of spacing rules indicating a particular margin to maintain in association with the loop connector path.

7. The method as recited in claim 1, the expanded loop connector path including an internal portion on which the second element is positioned, a first external portion, and a second external portion, the first external portion and second external portion together encompassing the second element.

8. A system comprising:

a database system implemented using a server system including at least one processor, the database system configurable to cause:

responsive to a first request from a client device to add an instance of a loop element type to a layout represented in a graphical user interface (GUI), updating, by a processor, the layout by adding a first loop element to the layout, the first loop element being defined by a loop element symbol and a loop connector path connected to the loop symbol, the first loop element corresponding to and representing a first set of computer-readable instructions configured to iterate over computer-readable instructions corresponding to elements added to the first loop element;

responsive to a second request to add an instance of a second element type to the first loop element, calculating, by the processor, a set of rendering parameters for a portion of the layout including the first loop element using a set of spacing rules and a set of dimensions associated with the second element type, the instance of the second element type corresponding to and representing a second set of computer-readable instructions;

generating, by the processor, an updated layout by applying the set of rendering parameters to the portion of the layout, the updated layout including an expanded first loop element defined by the loop symbol and an expanded loop connector path on which a second element of the second element type is positioned, the expanded loop connector path being connected to the loop symbol, the set of rendering parameters indicating a first set of coordinates associated with the expanded first loop element; and outputting, by the processor, the updated layout.

9. The system as recited in claim 8, the set of rendering parameters indicating a first set of coordinates associated with the expanded first loop element and a second set of coordinates associated with at least one of: a third element external to the first loop element or a connector external to the first loop element.

10. The system as recited in claim 8, the set of spacing rules including one or more rules associated with the loop element type.

11. The system as recited in claim 8, the first loop element including a first add element user interface (UI) component, the database system further configurable to cause:

responsive to an indication of user selection of the first add element UI component, generating an add element user interface including at least one input mechanism, an indication of selection of the second element type being received via the input mechanism.

12. The system as recited in claim 8, the expanded first loop element including two add element UI components, each add element UI component being including at least one input mechanism, the add element UI components being separated by the second element and being equidistant from the second element.

13. The system as recited in claim 8, the set of spacing rules indicating a particular margin to maintain in association with the loop connector path.

14. The system as recited in claim 8, the expanded loop connector path including an internal portion on which the second element is positioned, a first external portion, and a second external portion, the first external portion and second external portion together encompassing the second element.

15. A computer program product comprising a non-transitory computer-readable medium including program code, the program code comprising computer-readable instructions configurable to cause:

responsive to a first request from a client device to add an instance of a loop element type to a layout represented in a graphical user interface (GUI), updating, by a processor, the layout by adding a first loop element to the layout, the first loop element being defined by a loop element symbol and a loop connector path connected to the loop symbol, the first loop element corresponding to and representing a first set of computer-readable instructions configured to iterate over computer-readable instructions corresponding to elements added to the first loop element;

responsive to a second request to add an instance of a second element type to the first loop element, calculating, by the processor, a set of rendering parameters for a portion of the layout including the first loop element using a set of spacing rules and a set of dimensions associated with the second element type, the instance of the second element type corresponding to and representing a second set of computer-readable instructions;

generating, by the processor, an updated layout by applying the set of rendering parameters to the portion of the layout, the updated layout including an expanded first loop element defined by the loop symbol and an expanded loop connector path on which a second element of the second element type is positioned, the expanded loop connector path being connected to the loop symbol, the set of rendering parameters indicating a first set of coordinates associated with the expanded first loop element; and outputting, by the processor, the updated layout.

16. The computer program product as recited in claim 15, the set of rendering parameters indicating a first set of coordinates associated with the expanded first loop element and a second set of coordinates associated with at least one of: a third element external to the first loop element or a connector external to the first loop element.

17. The computer program product as recited in claim 15, the set of spacing rules including one or more rules associated with the loop element type.

18. The computer program product as recited in claim 15, the first loop element including a first add element user interface (UI) component, the computer-readable instructions further configurable to cause:

responsive to an indication of user selection of the first add element UI component, generating an add element user interface including at least one input mechanism, an indication of selection of the second element type being received via the input mechanism.

19. The computer program product as recited in claim 15, the expanded first loop element including two add element UI components, each add element UI component including at least one input mechanism, the add element UI components being separated by the second element and being equidistant from the second element.

20. The computer program product as recited in claim 15, the set of spacing rules indicating a particular margin to maintain in association with the loop connector path.

* * * * *